United States Patent [19]
Ueda et al.

[11] Patent Number: 5,513,878
[45] Date of Patent: May 7, 1996

[54] ELECTRONIC SYSTEM FOR ACTIVATING A VEHICLE RIDER PROTECTION APPARATUS

[75] Inventors: Hiroyuki Ueda; Takashi Furui, both of Hyogo, Japan

[73] Assignee: Mitsubishi Denki Kabushiki Kaisha, Tokyo, Japan

[21] Appl. No.: 995,700

[22] Filed: Dec. 23, 1992

[30] Foreign Application Priority Data

Dec. 24, 1991 [JP] Japan ................................. 3-340929

[51] Int. Cl.⁶ ........................................................ B60R 21/32
[52] U.S. Cl. .......................... 280/735; 340/436; 340/438; 340/514; 364/426.01
[58] Field of Search .......................... 340/438, 43, 511, 340/514, 522; 280/734, 735; 364/426.01; 307/10.1

[56] References Cited

U.S. PATENT DOCUMENTS

| | | | |
|---|---|---|---|
| 4,975,850 | 12/1990 | Diller | 340/438 |
| 5,181,011 | 1/1993 | Okano | 340/438 |
| 5,182,459 | 1/1993 | Okano et al. | 340/438 |
| 5,286,053 | 2/1994 | Lenzen et al. | 280/734 |

FOREIGN PATENT DOCUMENTS

| | | |
|---|---|---|
| 64-257817 | 10/1989 | Japan . |
| 8911986 | 12/1989 | WIPO . |

*Primary Examiner*—Eric D. Culbreth

[57] ABSTRACT

An electronic system for activating a vehicle rider protection apparatus capable of preventing the erroneous activation caused by the failure or malfunctioning of the triggering circuit in the system. An acceleration sensor produces a vehicle acceleration signal, and it is processed independently by a digital signal processor and analog signal processing circuits, which produce trigger signals $S_A$, $S_B$ and $S_D$ on detecting a collision of the vehicle. An OR gate takes logical sum of the signals $S_A$ and $S_B$, and produces a trigger signal $S_C$. An AND gate takes logical product of the signals $S_C$ and $S_D$, and produces a final trigger signal $S_E$. In response to the final trigger signal $S_E$, a current is supplied to a squib, which then ignites and activates the vehicle rider protection apparatus. A diagnostic circuit applies a test signal to the analog signal processing circuits, and tests the operation of the circuits by analyzing the outputs of the circuits.

18 Claims, 4 Drawing Sheets

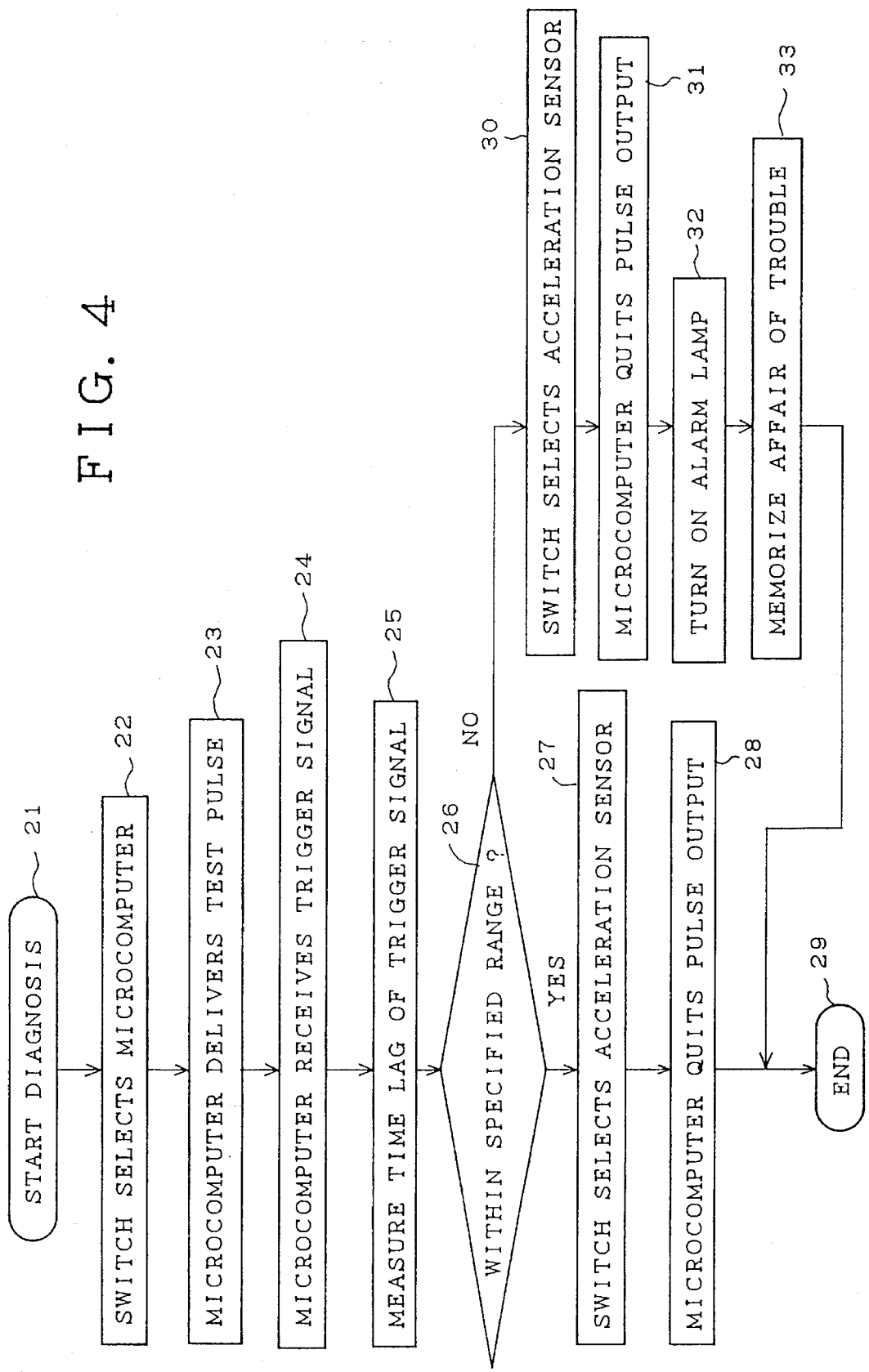

5,513,878

ELECTRONIC SYSTEM FOR ACTIVATING A VEHICLE RIDER PROTECTION APPARATUS

BACKGROUND OF THE INVENTION

1. Field of the Invention

The present invention relates to an electronic system which produces a trigger signal for activating a vehicle rider protection apparatus such as the airbag equipment at an event of collision of the vehicle 2. Description of the Prior Art FIG. 1 is a block diagram showing, as an example, the conventional activation system of a vehicle rider protection apparatus disclosed in Japanese Patent Unexamined Publication No. 3-121951. In the figure, reference numeral 34 denotes an acceleration sensor which produces an electrical signal indicative of the acceleration of the vehicle, and 35 is a control circuit which activates the protection apparatus.

The control circuit 35 consists of an analog filter 35A for eliminating high-frequency noises, a sampling circuit 35B, an acceleration monitoring circuit 35C which detects the sampled acceleration signal reaching a certain level, and an arithmetic circuit 35D which converts the acceleration signal into a signal indicative of the change of vehicle speed and compares the resulting signal with the preset data. Indicated by 36 is a memory circuit, and 36A is a data table which is stored in the memory circuit 36 and used for the judgement of collision.

Next, the operation of this arrangement will be explained. At an event of collision of the vehicle, the acceleration sensor 34 produces an acceleration signal indicative of the acceleration caused by the collision, and sends it to the sampling circuit 36B through the analog filter 35A. The sampling circuit 36B samples the acceleration signal at a certain time interval, and delivers the signal to the arithmetic circuit 35D and acceleration monitoring circuit 35C.

The arithmetic circuit 35D integrates the acceleration signal thereby to evaluate the speed change, and it compares the calculated value with speed change data of collision which is stored as the collision judgement data table 36A in connection with the passing time after collision and the vehicle speed. If the arithmetic circuit 35D detects the calculated speed change in excess of the speed change data and, at the same time, if the acceleration monitoring circuit 35C detects the acceleration signal reaching the predetermined value, the arithmetic circuit 35D produces a trigger signal S for activating the vehicle rider protection apparatus.

The conventional activation system of vehicle rider protection apparatus is formed of a single circuit unit based on a microcomputer, for example, and therefore the protection apparatus will not be activated if the microcomputer fails, or the protection apparatus may be activated erroneously if the microcomputer mulfunctions, and the failure of the microcomputer in not indicated promptly to the vehicle rider.

SUMMARY OF THE INVENTION

An object of this invention is to provide an electronic system for activating a vehicle rider protection apparatus, wherein the system has more than one triggering circuit so that even if one circuit fails, the protection apparatus can surely be activated by another circuit, and even if one circuit malfunctions, the protection apparatus is prevented from operating erroneously.

Another object of this invention is to provide an electronic system for activating a vehicle rider protection apparatus, wherein the system implements the diagnostic operation so that if it fails, the failure is indicated promptly to the vehicle rider.

According to one aspect of the present invention intended to achieve the above objectives, the electronic system for activating a vehicle rider protection apparatus comprises an acceleration sensor, a digital and analog signal processing means which produce trigger signals on detecting the collision of vehicle based on the acceleration signal, and a first circuit means which produces a trigger signal on receiving at least one of the outputs of the signal processing means.

According to another aspect of the present invention, the electronic system for activating a vehicle rider protection apparatus comprises another analog signal processing means which produces a trigger signal in response to a relatively small impact of collision, and a second circuit means which produces a final trigger signal only in response to the reception of the trigger signals from both the analog signal processing means and first circuit means.

According to still another aspect of the present invention, the electronic system for activating a vehicle rider protection apparatus comprises an acceleration sensor, a signal processing means which produces a trigger signal based on the acceleration signal, diagnostic means which tests the operation of the signal processing means based on the comparison of the output signal of the processing means with a prescribed test signal, and alarm indicator means for indicating the failure of the signal processing means.

The inventive activation system of vehicle rider protection apparatus operates to deliver the trigger signal of the analog signal processing means through the first circuit means even in the event of failure of the digital signal processing means, whereby the the protection apparatus can surely be activated.

The inventive activation system of vehicle rider protection apparatus operates such that even if the digital signal processing means malfunctions to produce an erroneous trigger signal through the first circuit means, the analog signal processing means does not produce a trigger signal and thus the second circuit means does not deliver the final trigger signal, whereby the protection apparatus is not activated erroneously.

The inventive activation system of vehicle rider protection apparatus operates such that the diagnostic means applies a prescribed test signal to the signal processing means, measures the time lag until it produces a trigger signal, analyzes the result of measurement with reference to a prescribed threshold, and activates the alarm indicator on detecting the failure of the signal processing means.

These and other objects and novel features of the present invention will become more apparent from the following detailed description taken in conjunction with the accompanying drawings. The drawings are solely intended for the purpose of illustration and they do not confine the scope of the invention.

BRIEF DESCRIPTION OF THE DRAWINGS

FIG. 4 is a flowchart showing an example of the diagnostic operation carried out by the microcomputer.

DESCRIPTION OF THE PREFERRED EMBODIMENTS

A preferred embodiment of the present invention will be described in detail with reference to the drawings.

Figure 1:
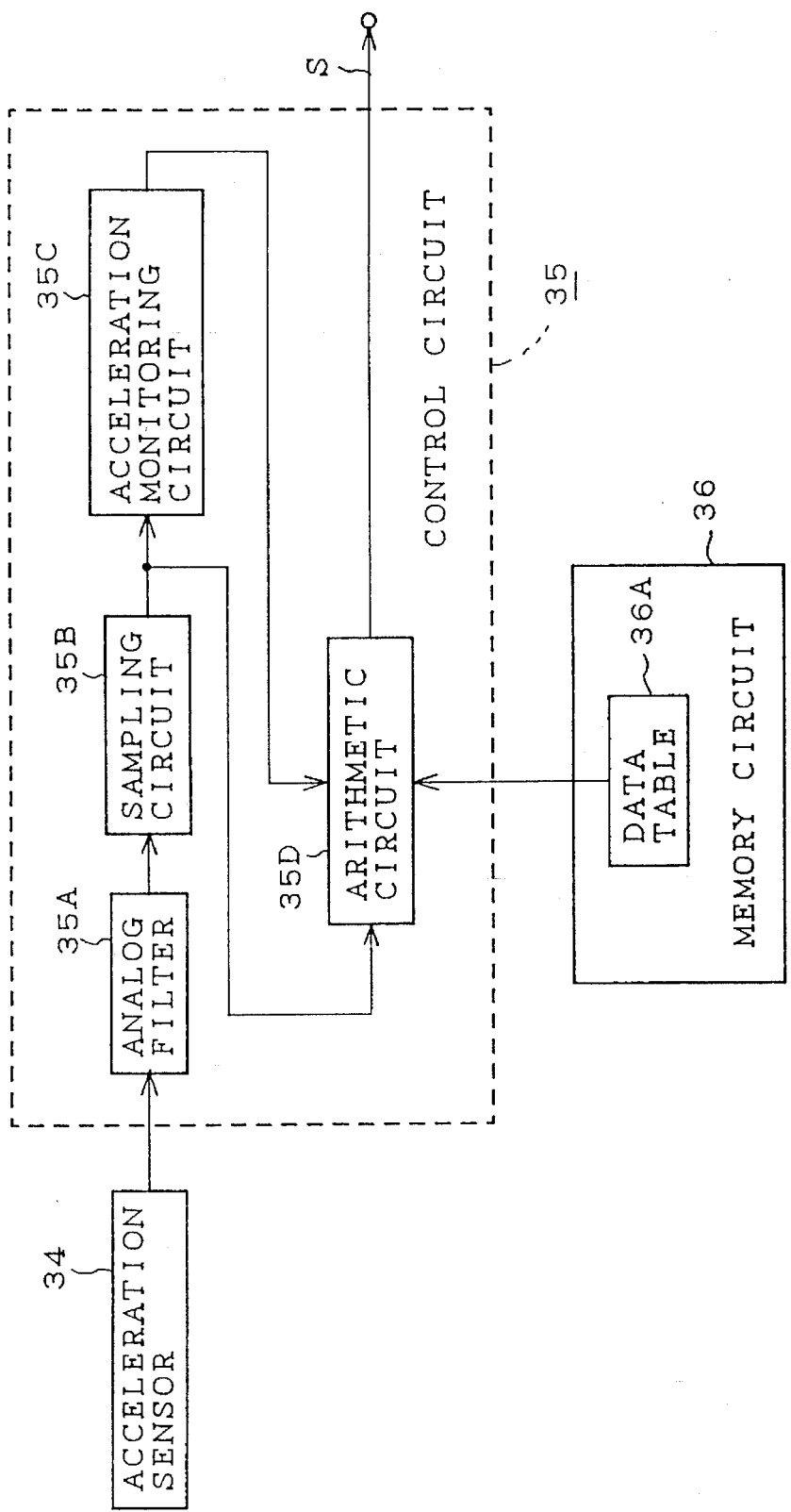
FIG. 1 is a block diagram showing an example of the conventional activation system of vehicle rider protection apparatus.
Figure 2:
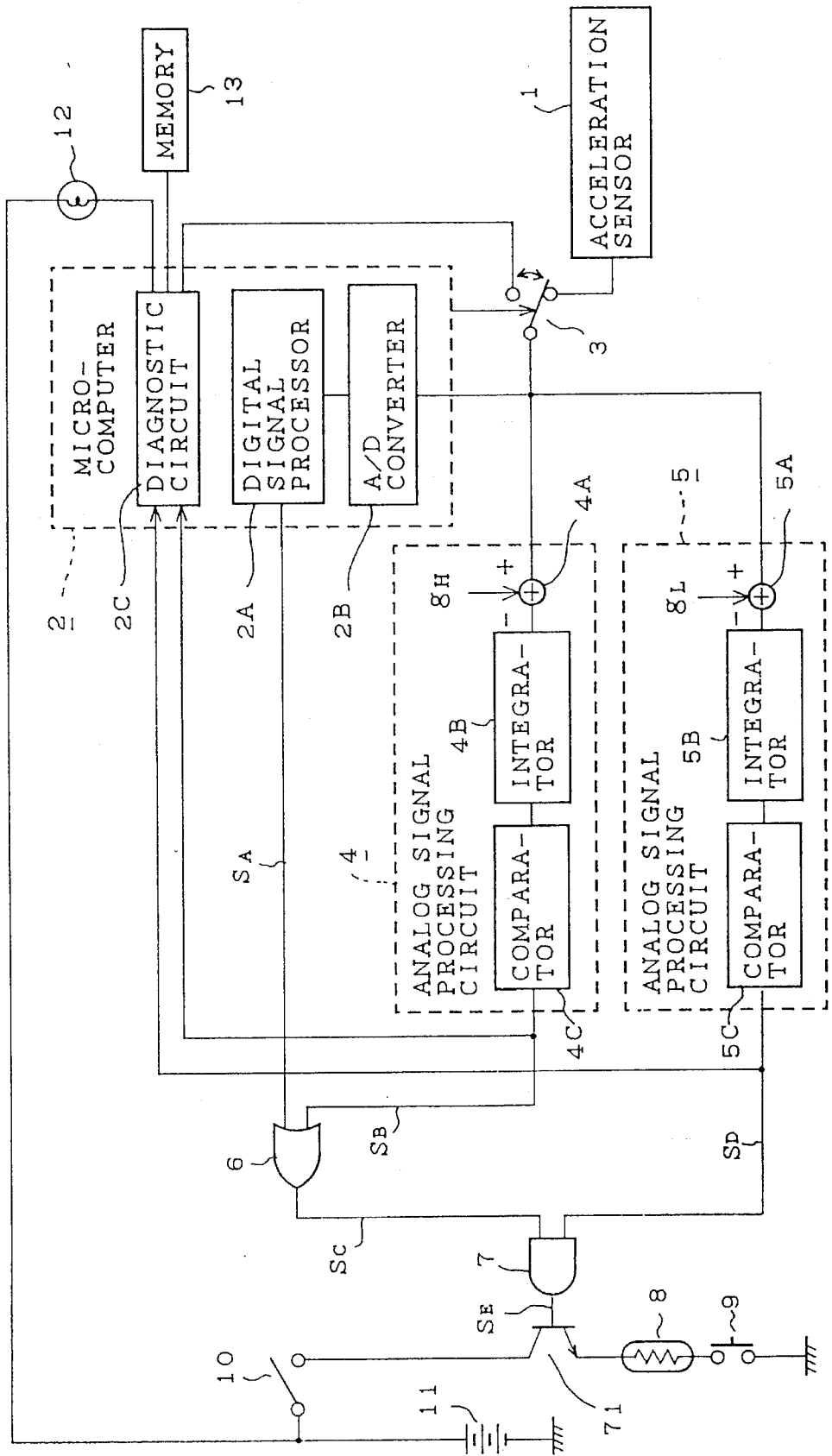
FIG. 2 is a block diagram showing the activation system of vehicle rider protection apparatus based on an embodiment of this invention.

FIG. 2 shows the arrangement of the activation system of vehicle rider protection apparatus based on an embodiment of this invention. In the figure, reference numeral 1 denotes an acceleration sensor which detects the acceleration of the vehicle and produces a signal indicative of the detected acceleration, and 2 is a microcomputer which implements the diagnostic operation for the triggering circuit, makes a judgement of collision by processing the acceleration signal provided by the acceleration sensor 1, and produces a trigger signal $S_A$ on detecting the collision of vehicle.

The microcomputer 2 includes a digital signal processor 2A which analyzes the waveform of the acceleration signal based on the frequency analysis for example thereby to detect even collisions of special circumstances, such as the plunging of the vehicle under an external object, an A/D converter 2B which converts the acceleration signal provided by the acceleration sensor 1 into a digital signal which is fed to the digital signal processor 2A, and a diagnostic circuit 2C which tests the operation of the triggering circuit.

Indicated by 3 is a switch circuit which is operated to switch from the position of acceleration sensor to the position of diagnostic circuit under control of the microcomputer 2 when the diagnostic operation takes place, 4 and 5 are analog signal processing circuits which independently process the analog acceleration signal from the sensor 1 and produce trigger signals $S_B$ and $S_D$ on detecting the collision of the vehicle based on the comparison of their processed signals with the preset threshold voltage level. The circuits 4 and 5 produce speed change signals of different levels for the same acceleration signal, and compare the signals with the threshold voltage.

The analog signal processing circuit 4 consists of the following components 4A–4C, and the analog signal processing circuit 5 consists of the following components 5A–5C. Indicated by 4A and 5A are arithmetic operators which subtract preset values $g_H$ and $g_L$ from the acceleration signal provided by the acceleration sensor 1, 4B and 5B are integrators which integrate the outputs of the operators 4A and 5A thereby to produce signals indicative of speed changes, and 4C and 5C are comparators which compare the output voltages of the integrators with the preset voltage representing the threshold of triggering and produce trigger signals $S_B$ and $S_D$ on detecting the integrated voltages in excess of the threshold.

Indicated by 6 is a logical OR gate which takes logical sum for the outputs of the analog signal processing circuit 4 and digital signal processor 2A, and 7 is a logical AND gate which takes logical product for the output of the OR gate 6 and the output of the analog signal processing circuit 5.

Indicated by 71 is a transistor having its base electrode connected to the output of the AND gate 7, 8 is a squib which ignites and activates the vehicle rider protection apparatus by being supplied with a current, 9 is a collision sensing switch having mechanical contacts which are connected to the emitter electrode of the transistor 71 and the ground, and 10 is an ignition switch placed between the collector electrode of the transistor 71 and the positive terminal of a battery 11 having its negative terminal grounded.

Indicated by 12 is an alarm lamp for indicating the failure of the analog signal processing circuit 4 or 8 to the vehicle rider, which is connected between the positive terminal of the battery 11 and the output port of the diagnostic circuit 2C, and 18 is a memory in connection with the diagnostic circuit 2C for memorizing the affair of trouble. The diagnostic operation takes place through the circuit loops including the diagnostic circuit 2C, switch circuit 3 and analog signal processing circuits 4 and 5.

Figure 3:
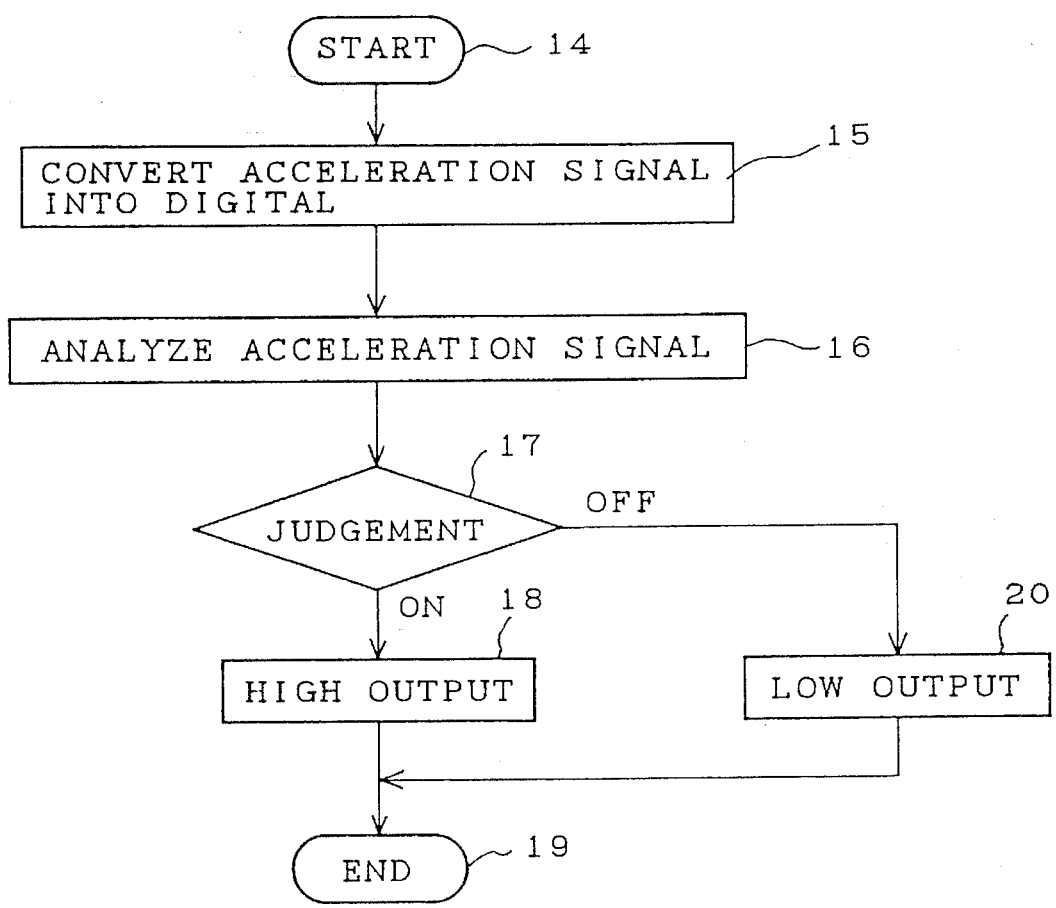
FIG. 3 is a flowchart showing an example of the operation of the microcomputer-based digital signal processor.

Next, the operation of this embodiment will be explained by mainly making reference to FIG. 2. At an event of collision of vehicle, the microcomputer 2 produces the trigger signal $S_A$ based on the acceleration signal provided by the acceleration sensor 1. This operation will be explained in more detail on the flowchart of FIG. 3.

Normally, the switch circuit 3 is set to connect the output of the acceleration sensor 1 to the inputs of the A/D converter 2B and analog signal processing circuits 4 and 5. After the operation has started in step 14, the A/D converter 2B converts the acceleration signal from the acceleration sensor 1 into a digital signal in step 15, and the digital signal processor 2A analyzes tile digital acceleration signal in step 16

In step 17, it is judged based on the result of analysis as to whether or not the vehicle rider protection apparatus is to be activated. If activation is determined, the digital signal processor 2A delivers the trigger signal $S_A$ in step 18, and the operation terminates in step 19, or otherwise a low-level signal is produced in step 20 and the operation terminates in step 19. The operational steps 14 through 20 take place repeatedly.

The acceleration signal is also sent to the arithmetic operator 4A in the analog signal processing circuit 4. The operator 4A subtracts the prescribed value $g_H$ from the acceleration signal, the integrator 4B produces a speed change signal from the output of the operator 4A, and the comparator 4C compares the speed change signal with the preset activation threshold voltage which signifies the prescribed speed change. If the detected speed change signal is in excess of the threshold, i.e., judgement of collision, the comparator 4C produces a high-level trigger signal $S_B$, or otherwise it produces a low-level signal.

The OR gate 6, which takes logical sum for the outputs of the digital signal processor 2A and analog signal processing circuit 4, produces a high-level trigger signal $S_C$ in response to the generation of the trigger signal $S_A$ or $S_B$. Accordingly, even if one of the digital signal processor 2A and analog signal processing circuit 4 fails, the other one produces the signal $S_A$ or $S_B$, and the OR gate 6 can deliver the trigger signal $S_C$. The OR gate 6 produces a low-level signal when the detected acceleration signal is below the threshold.

The analog signal processing circuit 5, which is designed to produce a trigger signal in response to a smaller impact of collision than the impact to which the analog signal processing circuit 4 is responsive, also receive the acceleration signal from the acceleration sensor 1. The arithmetic operator 5A subtracts the prescribed value $g_L$ ($0<g_L<g_H$) from the received acceleration signal and, after the subtracted signal is processed by the integrator 5B in the same manner as of the analog signal processing circuit 4, the comparator 5C produces a high-level trigger signal $S_D$ on determining a collision of vehicle, or otherwise it produces a low-level signal.

The AND gate 7, which takes logical product for the output of the OR gate 6 and the output of the analog signal processing circuit 5, produces a final high-level trigger signal $S_E$ on receiving both of the trigger signals $S_C$ and $S_D$, or otherwise it produces a low-level signal. If, for example, the digital signal processor 2A malfunctions to produce an erroneous trigger signal $S_A$ without the occurrence of collision, the analog signal processing circuit 5 has a low-level output and therefore the AND gate 7 does not produce the final trigger signal $S_E$.

When the AND gate 7 delivers the final trigger signal $S_E$, the impact sensing switch 9 is in a closed state in response to the impact of collision, and the transistor 71 becomes conductive. The ignition switch 10, which is normally ON during the vehicle operation, supplies a current through the transistor 71 to the squib 8, which then ignites and activates the vehicle rider protection apparatus. In case the AND gate 7 delivers a low-level signal, the transistor 71 is cut off and no current is supplied to the squib 8, and accordingly the vehicle rider protection apparatus is not activated.

Even if one of the digital signal processor 2A and analog signal processing circuit 4 fails to operate at an event of collision, the AND gate 7 produces the final trigger signal $S_E$, and the vehicle rider protection apparatus can be activated.

Even if the digital signal processor 2A malfunctions by some reason to produce an erroneous trigger signal $S_A$ without the occurrence of collision, the AND gate 7 keeps a low-level output, and the vehicle rider protection apparatus is not activated. In this case, the impact sensing switch 9 will not operate either, and prevents the protection apparatus from being activated erroneously.

Next, the diagnostic operation will be explained on the flowchart of FIG. 4. The diagnostic operation starts in step 21, and the switch circuit 3 is operated to turn from the position of acceleration sensor to the position of microcomputer. In the next step 23, the diagnostic circuit 2C in the microcomputer 2 supplies a voltage pulse of a certain amplitude and width to the analog signal processing circuits 4 and 5, which then respond to time test pulse to produce trigger signals $S_B$ and $S_D$, respectively.

The diagnostic circuit 2C receives these output signals in step 24, and in step 25 measures the time lag of the signals with respect to the test pulse thereby to verify the integration characteristics of the integrators 4B and 5B and the threshold values of the analog signal processing circuits 4 and 5 in producing the trigger signals $S_B$ and $S_D$.

The diagnostic circuit examines the measured values with reference to the specified values in step 26. If the measured values are found within the allowable range of specified values, indicative of the normality of the analog signal processing circuits 4 and 5, the switch circuit 3 is operated to select the acceleration sensor 1 under control of the microcomputer 2 in step 27. The diagnostic circuit 2C quits the supply of the test pulse in step 28, and the diagnostic operation terminates in step 29.

If, in step 26, any measured value is outside the specified range, indicative of the failure of at least one of the analog signal processing circuits 4 and 5, the diagnostic circuit carries out the steps 30, 31, 27 and 28, and thereafter turns on the alarm lamp 12 thereby to indicate the circuit failure to the vehicle rider in step 32. The diagnostic circuit 2C memorizes the affair of the trouble in the memory 13 in step 33, and the diagnostic operation terminates in step 29

The foregoing diagnostic operation takes place only when the vehicle is stationary and the vehicle rider protection apparatus is disconnected through the mechanical impact sensing switch 9, in such a state of vehicle immediately after the ignition key has been turned on.

As a modified circuit arrangement of FIG. 2, the analog signal processing circuit 5 and AND gate 7 are removed, and the output of the OR gate 6 is connected to the base electrode of the transistor 71. The operation of this modified arrangement is apparent from the above description of the embodiment, and further explanation is omitted.

According to this invention, as described above, the acceleration signal produced by the acceleration sensor is processed with the digital signal processing means and analog signal processing means thereby to detect the collision of vehicle, and the first circuit means delivers a trigger signal in response to at least one of outputs of the analog and digital signal processing means, whereby even if the digital signal processing means fails, the final trigger signal can surely be produced to activate the vehicle rider protection apparatus.

Another analog signal processing means having a lower threshold of acceleration also produces a collision detection output, and the second circuit means delivers the final trigger signal only in response to the reception of both the output of this analog signal processing means and the output of the first circuit means, whereby even if one analog signal processing means malfunctions to produce an erroneous trigger signal, the vehicle rider protection apparatus is prevented from being activated erroneously.

The diagnostic means tests the operation of the signal processing means by applying a test signal to them and examining their outputs with reference to the specified values and it activates the alarm indicator means on detecting any abnormality, whereby the failure of triggering circuit can be indicated promptly to the vehicle rider.

What is claimed is:

1. An electronic system for activating a vehicle rider protection apparatus comprising:
    an acceleration sensor which detects the acceleration of the vehicle and produces an electrical acceleration signal indicative of the detected acceleration;
    digital signal processing means which detects an event of collision of the vehicle based on the acceleration signal and produces a first detection signal in response to the detection of collision;
    a first analog signal processing means which detects an event of collision of the vehicle based on the acceleration signal and produces a second detection signal in response to the detection of collision;
    first circuit means for producing a trigger signal for activating the vehicle rider protection apparatus in response to either one of the first and second detection signals
    a second analog signal processing means which produces a third detection signal, based on the acceleration signal, which is indicative of a smaller impact of collision than an impact to which said digital signal processing means and said first analog signal processing means are responsive; and
    a second circuit means which produces a final trigger signal for activating the vehicle rider protection apparatus only in response to the reception of both the trigger signal and the third detection signal.

2. An electronic system for activating a vehicle rider protection apparatus according to claim 1, further comprising:

diagnostic means which applies a prescribed signal to said first analog signal processing means and examines the first detection signal to determine whether or not the first detection signal is within a specified range with respect to the prescribed signal thereby to test the operation of said first analog signal processing means; and alarm means for indicating the failure of said first analog means in response to output from the diagnostic means.

3. The electronic system for activating a vehicle rider protection apparatus of claim 2, wherein said diagnostic means includes means for measuring a time lag between the application of the prescribed signal and the receipt of the first detection signal and comparing the time lag to a predetermined value to thereby test the operation of said first analog signal processing means.

4. The electronic system for activating a vehicle rider protection apparatus of claim 2, further comprising a switch that switches the input of said first analog signal processing means to allow said diagnostic means to supply the prescribed signals to said first analog signal processing means.

5. The electronic system for activating a vehicle rider protection apparatus of claim 1, wherein said first analog signal processing means further comprises means for subtracting a first predetermined value from the acceleration signal; means for integrating the subtracted, acceleration signal and means for comparing the integrated signal to a second predetermined value to determine whether to output the second detection signal.

6. An electronic system for activating a vehicle rider protection apparatus, comprising:

an acceleration sensor detecting the acceleration of a vehicle and producing an acceleration signal indicative of the detected acceleration;

a digital signal processor detecting collision of the vehicle based on the acceleration signal and producing a first detection signal in response to the detection of collision;

a first analog signal processor detecting vehicle collision of a first magnitude based on the acceleration signal and producing a second detection signal in response to the detection of collision;

a second analog signal processor detecting vehicle collision of a second magnitude based on the acceleration signal and producing a third detection signal in response to the detection of collision, the vehicle collision of the second magnitude being different from the vehicle collision of the first magnitude; and an activation circuit producing a trigger signal to activate the vehicle rider protection apparatus based on the first, second and third detection signals.

7. An electronic system for activating a vehicle rider protection apparatus according to claim 6, further comprising:

a mechanical collision sensor mechanically detecting vehicle collision; and wherein the activation circuit produces a trigger signal to activate the vehicle rider protection apparatus based on the first, second and third detection signal and collision detection by the mechanical collision sensor.

8. An electronic system for activating a vehicle rider protection apparatus according to claim 6, wherein said second analog signal processor detects vehicle collision of the second magnitude based on the acceleration signal, the vehicle collision of the second magnitude being less than the vehicle collision of the first magnitude.

9. An electronic system for activating a vehicle rider protection apparatus according to claim 6, wherein the activation circuit produces the trigger signal if only one of the first and second detection signals are received, the third detection signal is received, and the mechanical collision sensor detects vehicle collision.

10. An electronic system for activating a vehicle rider protection apparatus according to claim 6, further wherein the digital signal processor includes a diagnostic circuit which applies a prescribed signal to the first and second analog circuit, receives the second and third detection signals, and determines whether the first and second analog signal processors are functioning normally by comparing the second and third detection signals to respective specified ranges.

11. An electronic system for activating a vehicle rider protection apparatus according to claim 10, further comprising an indicator which indicates failure of at least one of the first and second analog signal processors when the diagnostic circuit determines that one of the second and third detection signals produced in response to the prescribed signal falls outside the respective specified range.

12. The electronic system for activating a vehicle rider protection apparatus of claim 10, wherein said diagnostic circuit measures respective time lags between the application of the prescribed signal and the receipt of the first and second detection signals and compares the time lags to a predetermined value to thereby test the operation of said first analog signal processing means.

13. The electronic system for activating a vehicle rider protection apparatus of claim 10, further comprising a switch that switches the input of said first and second analog signal processors to allow said diagnostic circuit to supply the prescribed signals to said first and second analog signal processors.

14. The electronic system for activating a vehicle rider protection apparatus of claim 6, wherein said first and second analog signal processors further comprise a subtractor subtracting respective first and second predetermined values from the acceleration signal; an integrator integrating the subtracted, acceleration signal and a comparator comparing the integrated, subtracted acceleration signal to a third predetermined value to determine whether to output the respective first and second detection signals.

15. A method for activating a vehicle rider protection apparatus, comprising the steps of:

sensing acceleration of a vehicle, digitally processing the sensed acceleration to produce a first detection signal in response to a vehicle impact, analog processing the sensed acceleration to produce a second detection signal in response to a vehicle impact, producing a third detection signal indicative of a smaller vehicle impact than a vehicle impact which causes production of said first and second detection signals, and triggering the vehicle protection apparatus when the third detection signal is produced and either one of the first and second detection signals are produced.

16. The method according to claim 15, further comprising the steps of:

mechanically detecting a vehicle impact, and triggering the vehicle protection apparatus in response to the mechanical detection of a vehicle impact and either one of the first and second detection signals.

17. A method for activating a vehicle rider protection apparatus, comprising the steps of:

sensing acceleration of a vehicle;

digitally processing the sensed acceleration to produce a first detection signal in response to a vehicle impact;

analog processing the sensed acceleration to produce a second detection signal in response to a vehicle impact and a third detection signal indicative of a smaller vehicle impact than a vehicle impact which causes production of the first and second detection signals;

mechanically detecting a vehicle impact; and triggering the vehicle protection apparatus in response to the mechanical detection of a vehicle impact and the first, second and third detection signals.

18. The method according to claim 17 wherein the triggering step further comprises triggering the vehicle protection apparatus only if an impact is mechanically detected in said mechanically detecting step, the third detection signal is produced and one of the first and second detection signals are produced.

* * * * *